US007586542B2

(12) United States Patent
Reynolds et al.

(10) Patent No.: US 7,586,542 B2
(45) Date of Patent: Sep. 8, 2009

(54) METHODS FOR IMPROVED MODULATION OF VIDEO SIGNALS

(75) Inventors: Michael C. Reynolds, Ballwin, MO (US); Yousri H. Barsoum, St. Louis, MO (US); Edward J. Koplar, St. Louis, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 82 days.

(21) Appl. No.: 11/383,400

(22) Filed: May 15, 2006

(65) Prior Publication Data

US 2006/0209209 A1 Sep. 21, 2006

Related U.S. Application Data

(63) Continuation of application No. 10/958,865, filed on Oct. 4, 2004, now Pat. No. 7,075,583.

(60) Provisional application No. 60/512,625, filed on Oct. 20, 2003.

(51) Int. Cl.
 *H04N 7/08* (2006.01)
(52) U.S. Cl. ............... 348/473; 348/460; 348/475; 348/461; 348/471; 348/472
(58) Field of Classification Search ........ 348/473, 348/460, 475, 461, 474, 724, 471, 472; 345/690, 345/694, 696, 695, 698, 63, 77; 725/136
See application file for complete search history.

(56) References Cited

U.S. PATENT DOCUMENTS

| | | | |
|---|---|---|---|
| 3,993,861 A | 11/1976 | Baer | |
| 4,654,700 A | 3/1987 | Baer | |
| 4,807,031 A | 2/1989 | Broughton et al. | |
| 5,010,499 A | 4/1991 | Yee | |
| 5,057,915 A | 10/1991 | Von Kohorn | |
| 5,325,127 A | 6/1994 | Dinsel | |
| 5,557,334 A * | 9/1996 | Legate | 348/473 |
| 5,587,743 A * | 12/1996 | Montgomery et al. | 348/473 |
| 5,594,493 A | 1/1997 | Namirofsky | |
| 5,808,689 A * | 9/1998 | Small | 348/476 |
| 5,929,920 A * | 7/1999 | Sizer, II | 348/473 |
| 6,072,521 A | 6/2000 | Harrison et al. | |
| 6,094,228 A | 7/2000 | Ciardullo et al. | |
| 6,118,490 A | 9/2000 | Moore et al. | |

(Continued)

OTHER PUBLICATIONS

U.S. Appl. No. 10/958,865, Non-Final Office Action mailed Mar. 28, 2005, 6 pgs.

(Continued)

*Primary Examiner*—David L Ometz
*Assistant Examiner*—Jean W Désir
(74) *Attorney, Agent, or Firm*—Polsinelli Shughart PC

(57) ABSTRACT

A method for modulating a video signal. Frames of a plurality of frames are selected for modulation. A first magnitude alternation pattern is designated for each of a first area of a field of the selected frames. A second magnitude alternation pattern is designated for each of a second area of the field of the selected frames. The intensity of a plurality of pixels of a plurality of scan lines of the field of the selected frames is altered as designated by either the first magnitude alternation pattern or the second magnitude alternation pattern.

21 Claims, 16 Drawing Sheets

U.S. PATENT DOCUMENTS

| | | | |
|---|---|---|---|
| 6,229,572 | B1 | 5/2001 | Ciardullo et al. |
| 6,246,439 | B1 * | 6/2001 | Zink et al. .................. 348/473 |
| 6,415,438 | B1 | 7/2002 | Blackketter et al. |
| 6,459,803 | B1 * | 10/2002 | Powell et al. ............... 382/100 |
| 6,535,253 | B2 * | 3/2003 | Barton et al. ............... 348/473 |
| 6,593,972 | B1 | 7/2003 | Johnson, Jr. |
| 6,628,801 | B2 * | 9/2003 | Powell et al. ............... 382/100 |
| 6,647,548 | B1 * | 11/2003 | Lu et al. ....................... 725/20 |
| 6,661,905 | B1 | 12/2003 | Chupp et al. |
| 6,704,058 | B2 * | 3/2004 | Ranta ......................... 348/465 |
| 6,742,188 | B1 * | 5/2004 | Del Castillo ................ 725/153 |
| 6,804,377 | B2 * | 10/2004 | Reed et al. .................. 382/100 |
| 6,992,726 | B2 * | 1/2006 | Chupp et al. ............... 348/473 |
| 7,003,132 | B2 * | 2/2006 | Rhoads ....................... 382/100 |
| 7,116,374 | B2 * | 10/2006 | Chupp et al. ............... 348/473 |
| 7,167,209 | B2 * | 1/2007 | Cookson et al. ............ 348/473 |
| 7,286,188 | B2 * | 10/2007 | Chupp et al. ............... 348/473 |
| 2002/0112250 | A1 | 8/2002 | Koplar et al. |
| 2002/0183102 | A1 | 12/2002 | Withers et al. |
| 2004/0117856 | A1 | 6/2004 | Barsoum et al. |
| 2004/0210814 | A1 | 10/2004 | Cargnoni et al. |
| 2005/0015815 | A1 | 1/2005 | Shoff et al. |
| 2006/0192893 | A1 | 8/2006 | Reynolds et al. |

OTHER PUBLICATIONS

U.S. Appl. No. 10/958,865, Notice of Allowance mailed Nov. 4, 2005, 4 pgs.

U.S. Appl. No. 10/958,865, Response filed Apr. 28, 2005 to Non-Final Office Action mailed Mar. 28, 2005, 6 pgs.

U.S. Appl. No. 10/958,865, Final Office Action mailed Jul. 13, 2005, 6 pgs.

U.S. Appl. No. 10/958,865, Response filed Oct. 12, 2005 to Final Office Action mailed Jul. 13, 2005, 3 pgs.

U.S. Appl. No. 10/676,940, Preliminary Amendment filed Oct. 1, 2003, 9 pgs.

"U.S. Appl. No. 10/676,940, Non-Final Office Action mailed Feb. 5, 2008", 35 pgs.

"U.S. Appl. No. 11/383,394, Non-Final Office Action Mailed Jan. 9, 2008", 12.

"U.S. Appl. No. 10/676,940, Response filed Jul. 7, 2008 to Non-Final Office Action mailed Feb. 5, 2008", 10 pgs.

"U.S. Appl. No. 11/383,394, Response to Non-Final Office Action filed Feb. 18, 2008", 14 pgs.

"U.S. Appl. No. 11/383,394, Final Office Action mailed Jul. 15, 2008", FOAR, 10pgs.

* cited by examiner

METHODS FOR IMPROVED MODULATION OF VIDEO SIGNALS

CROSS-REFERENCE TO RELATED APPLICATION

This application is a Continuation of U.S. application Ser. No. 10/958,865, filed on Oct. 4, 2004, now U.S. Pat. No. 7,075,583, which claims the benefit of U.S. Provisional Patent Application Ser. No.: 60/512,625, filed Oct. 20, 2003, which are herein incorporated by reference.

BACKGROUND

The present invention relates to methods of encoding an auxiliary signal within a video signal, and more particularly to methods for subliminally modulating a video signal with an auxiliary signal by use of an encoding improvement in a manner that is not only less perceptible or imperceptible to viewers of the video signal but also easier to detect by a detector.

A video signal is modulated to contain an auxiliary signal at an encoder thereby creating a modulated video signal. The modulated video signal is then transmitted from a signal source to either a display device where the auxiliary signal may be optically detected by use of a hand-held optical detector or electrically detected by an inline detector.

Users of these detectors selectively receive auxiliary signals for purposes including enjoyment, promotion, transfer of information, data collection, commercial verification, security, education, and transactions or verifications at points of sale, as well as other commercial, personal, entertainment, or amusement purposes collectively referred to herein as "promotional opportunities".

U.S. Pat. No. 4,807,031 to Broughton et al. ("Broughton") entitled "Interactive Video Method and Apparatus" relates generally to in-band video broadcasting of commands and other encoded information to interactive devices. The invention described therein relates generally to interactive educational and entertainment systems, and is described in one embodiment in the context of television program control of toys located where there is a television receiver, as within a residence.

To encode control data capable of providing a benefit to a user, Broughton discloses a novel method of luminance or chrominance modulation of a video signal that creates a modulated video signal, wherein the video signal is modulated with control data. The novel modulation method alternately raises and lowers the luminance/chrominance of adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye and relatively invisible. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either optoelectronic or radio frequency (RF) detection means that discriminate between the program material and the control data to detect the control data. The detected control data is further reproduced so that the control data can be used with an interactive device.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of modulation wherein the auxiliary data is inserted on the visual portion of a video signal by changing the luminance of paired scan lines in opposite directions. Instead of raising and lowering the intensity on the whole line as in Broughton, Ciardullo uses pseudo noise sequences to raise and lower the intensity on portions of a first line, where the line paired to the first line is modulated with the inverse pseudo noise sequences. Ciardullo thereby allows larger amounts of auxiliary data to be modulated in the video signal by use of the pseudo noise sequences. Broughton and Ciardullo, which are owned by the assignee of the present invention, are incorporated by reference herein.

Yet another patent application by the assignees of the present invention is U.S. patent application entitled "RBDS Method and Device for Processing Promotional Opportunities", Ser. No. 10/126,770, filed on Apr. 19, 2002, of James G. Withers and Alan G. Maltagliati (referred to hereinafter as "Withers I"), which is incorporated by reference herein. Withers I describes further improvements to Koplar I and Koplar II including the transmission of auxiliary data to a hand-held device by use of the RBDS system.

Still another patent application by the assignees of the present invention is U.S. patent application entitled "Method and Apparatus for Modulating a Video Signal With Data", Ser. No. 10/676,940, filed on Oct. 1, 2003, of Yousri H. Barsoum, Alan G. Maltagliati, Daniel A. Ciardullo and Christopher E. Chupp (the application being herein referred to as "Barsoum"), which is incorporated by reference herein. Barsoum describes the use of a memory card coupled to a slotted hand-held device for receiving video signals modulated with carrier signals by use of the memory card, transmitting the signals from the card to the slotted hand-held device, detecting the carrier signals or decoding auxiliary data from the video signals on the slotted hand-held device and providing the user of the slotted hand-held device with a benefit from the detection of the carrier signals and/or the reception of the auxiliary data. Barsoum also describes a method of improving the reliability and speed of the transmission and reception of auxiliary data by storing data in video frames split into multiple regions and encoding complementary data bits in each region.

Still another patent application by the assignees of the present invention is U.S. patent application entitled "Method And System of Detecting Signal Presence from a Video Signal Presented on a Digital Display Device", Ser. No. 10/817,109, filed on Apr. 2, 2004, of James G. Withers, Yousri H. Barsoum, Edward J. Koplar and Michael C. Reynolds (the application being herein termed "Withers II"), which is incorporated by reference herein. Withers II describes several methods and apparatus for modulating video signals with signal presence and signal absence for use on digital display devices.

Yet another patent application by the assignees of the present invention is U.S. patent application entitled "Method and System for Enhanced Modulation of Video Signals", Ser. No. 10/888,919, filed on Jul. 9, 2004, of Christopher E. Chupp, Michael S. Gramelspacher, Jesse J. Chounard II, James G. Withers, Yousri H. Barsoum and Michael C. Reynolds (the application being herein termed "Chupp"), which is incorporated by reference herein. Chupp describes a method and apparatus for determining an optimum level and placement of a carrier signal (i.e., an auxiliary signal) to be modulated into an active portion of a video signal so as to deter nefarious third parties from stripping the carrier signal out of the video signal and increase the detectability of the carrier signal within the video signal without noticeably decreasing the clarity of a picture represented by video signal to a viewer.

At the time of the present invention, analog display devices (e.g., NTSC televisions) operate by use of a fine pitch electron beam that strikes phosphors coating on an internal face of the cathode ray tube (CRT). The phosphors emit light of an intensity which is a function of the intensity of the beam striking it. A period of 1/60 second is required for the electron beam to completely scan down the CRT face to display a field of the image. During the following 1/60 second, an interlaced field is scanned, and a complete frame of video is then visible on the analog display device. The phosphors coating on the face of the tube is chemically treated to retain its light emitting properties for a short duration. Thus, the first area of the scanned picture begins to fade just as the electron beam retraces (i.e., during the vertical retrace) to the top of the screen to refresh it. Since the electron beam covers 525 lines 30 times per second, a total of 15,750 lines per second is viewed each second.

Broughton's method of encoding a carrier signal in a video signal and its improvements were generally intended for use with an analog display device. Upon receiving the video signal from the signal source, such a display device splits the video signal into sequentially transmitted images referred to as frames, whereby each frame of an NTSC television image has 525 horizontal scan lines. The display device scans 262.5 of the horizontal lines left to right and top to bottom by skipping every other line, thus completing the scan of a first field, and then retracing to the top of the image and scanning the remaining 262.5 lines, for a second field. The fields are interlaced at the display device and construct one complete frame. When the video signal is broadcast at 525 lines per frame and 30 frames a second there are 60 fields per second and a line frequency rate (i.e., the speed at which lines are refreshed) of 15,750 Hz (i.e., approximately 16 kHz). Despite the success of the technology of Broughton and its improvements, wherein the modulation of video with carrier signals results in at no worse than subliminal visual changes which are substantially invisible, there is a need in the art for a new apparatus and method for modulating a video signal with an auxiliary signal wherein the signal is even more completely invisible and yet more reliably detected.

Although Broughton has been frequently used and well received since its inception, the relative invisibility of the carrier signal in the picture of the display device and the ease of detecting the carrier signal from the display device by a hand-held device or other detector can be yet improved. A slight tendency to visibility may occur when the voltage of the carrier signal is increased for the purpose of increasing the carrier signal's detectability, as television viewers might then slightly perceive the effects of the carrier signal on the visible picture, such as a slight tendency of visible lines or a slight deterioration in the picture quality. Since one of the advantages of using Broughton is its relative invisibility of auxiliary data to the human eyesight, any tendency of viewing the effects of the carrier signal is undesirable.

The invisibility challenge is typically resolved by reducing the voltage (i.e., as resultant luminosity) added to or removed from the selected video scan lines. However, lowering the overall signal intensity decreases the reliability of detecting the carrier signal and creates difficulty in detecting the carrier signal on a hand-held device over a distance from a display device, so that users may not receive the carrier signal, auxiliary data and/or promotional opportunity they expected to receive.

In making use of the present invention, signals are received, detected, and reproduced by the hand-held devices and other receivers for various promotional opportunities including: enjoyment; promotion; coupon or prize validation; advertising by sponsors; advertising verification and polling; transfer of information; data collection; commercial verification; security and access; education; game playing; transactions; verifications; or redemption by sponsoring entities or related commercial locations at points of sale including the Internet; or for other commercial and non-commercial purposes.

For purposes of the present invention, the term "hand-held device" means an interactive device of portable character, preferably of hand-held type that may be carried in the palm by a user, or between fingers of the user, or is otherwise intended to be easily grasped and handled manually by the user. Smart cards, mobile phones, personal digital assistants (PDAs), gaming devices and similar hand-held devices with or without capability for memory cards that are capable of participating with the promotional opportunities described in the present invention and are collectively referred to herein as "hand-held devices" of the present invention.

The term "computer" is also used herein in its broadest possible sense, and may include without limitation a laptop, compact or personal computer, mobile phone, gaming device, personal digital assistant (PDA), or other computer-like device, or other devices using one or more microprocessors or digital processors to achieve a computing or data processing or data manipulative process or comparable or similar functions.

SUMMARY

The following improvements for modulating a video signal with an auxiliary signal by use of an encoding improvement is an improvement upon the methods and apparatuses previously disclosed in Broughton and its improvements including Withers I, Withers II, Barsoum and Chupp. The present invention relates to methods and apparatus for modulating a video signal with a carrier signal thereby creating a modulated video signal, and for receivers capable of obtaining the modulated video signal and associated circuitry for detecting the carrier signal for a variety of purposes.

A video signal is transmitted from a signal source to an encoder. An operator interacts with the encoder to control its operation. An auxiliary signal is selectively modulated within the video signal by the encoder over a time interval by the operator for signaling purposes. Upon modulating the video signal, the encoder 12 outputs a modulated video signal comprised of the video signal and the subliminally encoded auxiliary signal. The modulated video signal is then provided to a broadcast source for distribution to an end-user who will view the video program associated with the modulated video signal.

The broadcast source provides the modulated video signal to a device capable of detecting modulated auxiliary signal such as an inline detector or an optical detector. This device, the detector, determines when auxiliary signal 20 is present in one or more fields of modulated video signal 22 by providing a signal absence or a signal presence to a signaled device depending on whether the auxiliary signal is suitably present.

The general encoding method of the present invention comprises a first step where the encoder obtains the video signal from the signal source. Thereafter, the operator instructs the encoder to modulate one or more sub-fields of one or more fields of the video signal. The encoder then determines whether to modulate the current field of video signal based on the previously received operator instructions. If no, the encoder skips the current field. If yes, the encoder proceeds to determine whether to encode the current sub-field of the video signal.

If the encoder is not to encode the current sub-field, the encoder skips the sub-field encoding process. If the encoder is to encode the current sub-field, the encoder first designates the scan lines of the current sub-field of video signal as either up lines or down lines. The encoder then calculates the amount of adjustment to the intensity of the pixels of the scan lines. Finally, the encoder adds intensity to selected pixels on the up lines and reduces intensity to selected pixels on the down lines. Upon completion, the encoder repeats the foregoing process for remaining sub-fields in the current field and for remaining fields in the video signal.

In a first encoding improvement, the encoder staggers the designation of the odd lines in the field of the video signal as up lines and the even lines as down lines with the designation of the odd lines as down lines and the even lines as up lines by use of a staggered flag.

In a second encoding improvement, pixels of the video signal that are located in a special encode area have their intensity modified at a higher magnitude.

In a third encoding improvement, scan lines within a transition area are modulated at a lower intensity so as to reduce the appearance of the transition line.

In a forth encoding improvement, scan lines within a phasing area are modulated according to a phasing pattern so as to reduce the appearance of the transition line.

In a fifth encoding improvement, pixels located on sharp edges in the video signal have their intensity modified at a higher magnitude.

In a sixth encoding improvement, the encoding pattern is repeated multiple times at first increasing and then decreasing magnitude of intensity level modifications.

In a seventh encoding improvement, the intensity is applied to scan lines in a dashed pattern.

In an eighth improvement, benefits are provided to detectors of the auxiliary signal along with timing information as to when the benefit should be provided to the user of the detector.

The uses, objects and advantages of the invention are more fully developed in, and may be appreciated from, the following description.

BRIEF DESCRIPTION OF THE DRAWINGS

Corresponding reference characters indicate corresponding elements among the several views.

DETAILED DESCRIPTION OF EMBODIMENTS OF THE INVENTION

Figure 1:
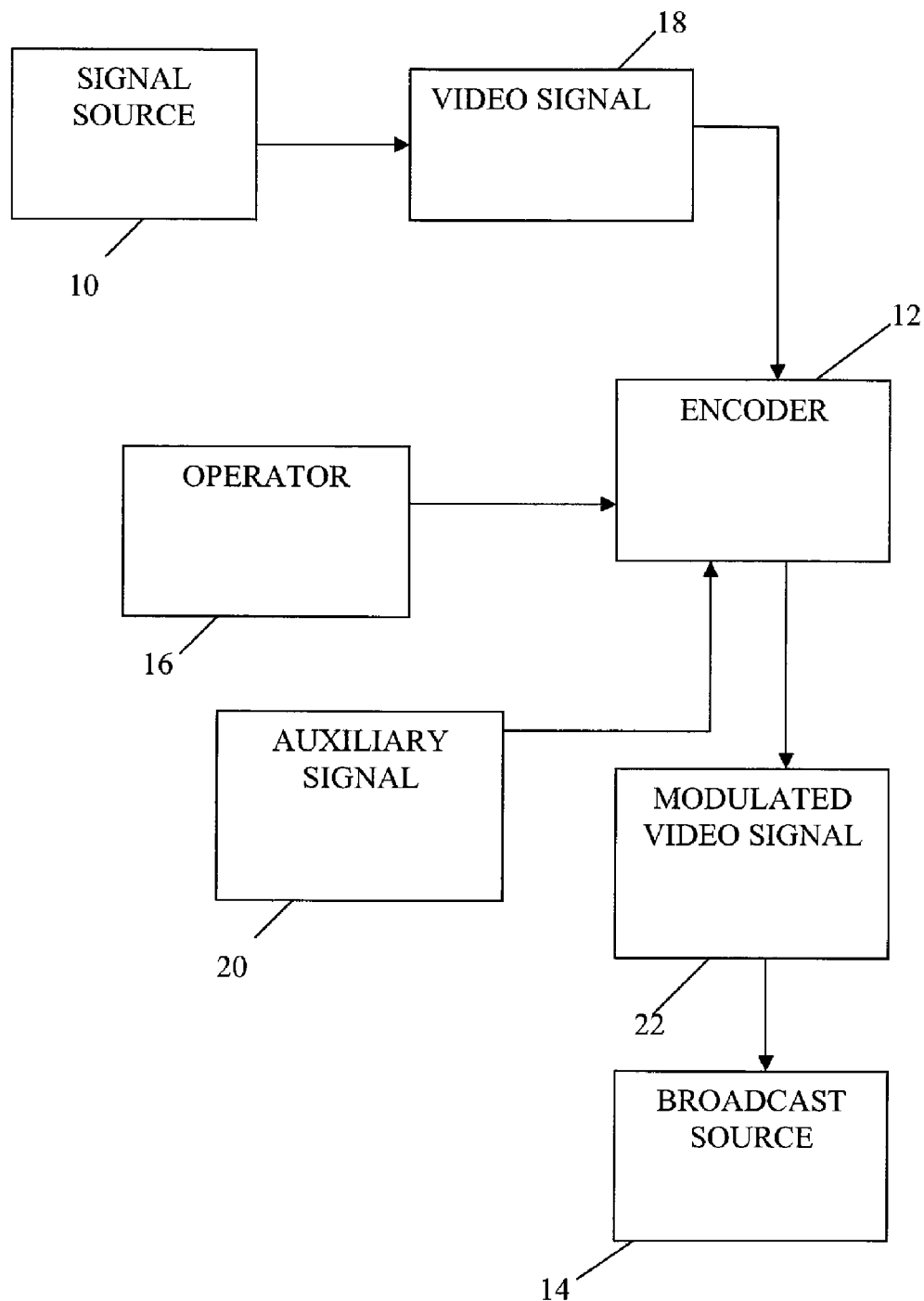
FIG. 1 is a block diagram of encoding components of the present invention.

Referring to the drawings, a method, apparatus and system for modulating an auxiliary signal within an active portion of a video signal in a manner that the detectability of the auxiliary signal is increased without noticeably altering the video program presented to the viewer via the video signal is illustrated in FIGS. 1-16.

Referring to FIG. 1, a video signal 18 is transmitted from a signal source 10 to an encoder 12. Video signal 18 is preferably an analog video signal in NTSC (National Television Standards Committee) format, but may be other video signals or video signal formats compatible with the present invention as will be appreciated in the art of video. Signal source 10 is typically a professional grade video tape player with a video tape containing a video program, but may be other media sources of including a camcorder or a digital versatile disc (DVD) player with a DVD video containing a video program. Encoder 12 is described in greater detail below.

Operator 16 interacts with encoder 12 to control operation of encoder 12. Preferably, operator 16 is a person that interacts with encoder 12 through the use of a computer or other electronic control device. However, operator 16 may consist entirely of a computer or other electronic control device that directs operation of encoder 12 in an automated manner.

An auxiliary signal 20 is selectively modulated within video signal 18 by encoder 12 over a time interval by operator 16 for signaling purposes, such as to indicate a signal presence or signal absence at desired locations in video signal 18. Upon modulating video signal 18, encoder 12 outputs a modulated video signal 22 comprised of video signal 18 and subliminally encoded auxiliary signal 20. The process of modulating video signals 18 is described in greater detail below.

Modulated video signal 22 is provided to a broadcast source 14 for distribution to an end-user who will view the video program associated with modulated video signal 22. Broadcast source 14 provides the video program to one or more end users by means of digital storage media or transmission source including DVD video, video tapes, television broadcast stations, cable or satellite sources or wireless sources that broadcast or otherwise transmit video programs.

Figure 2:
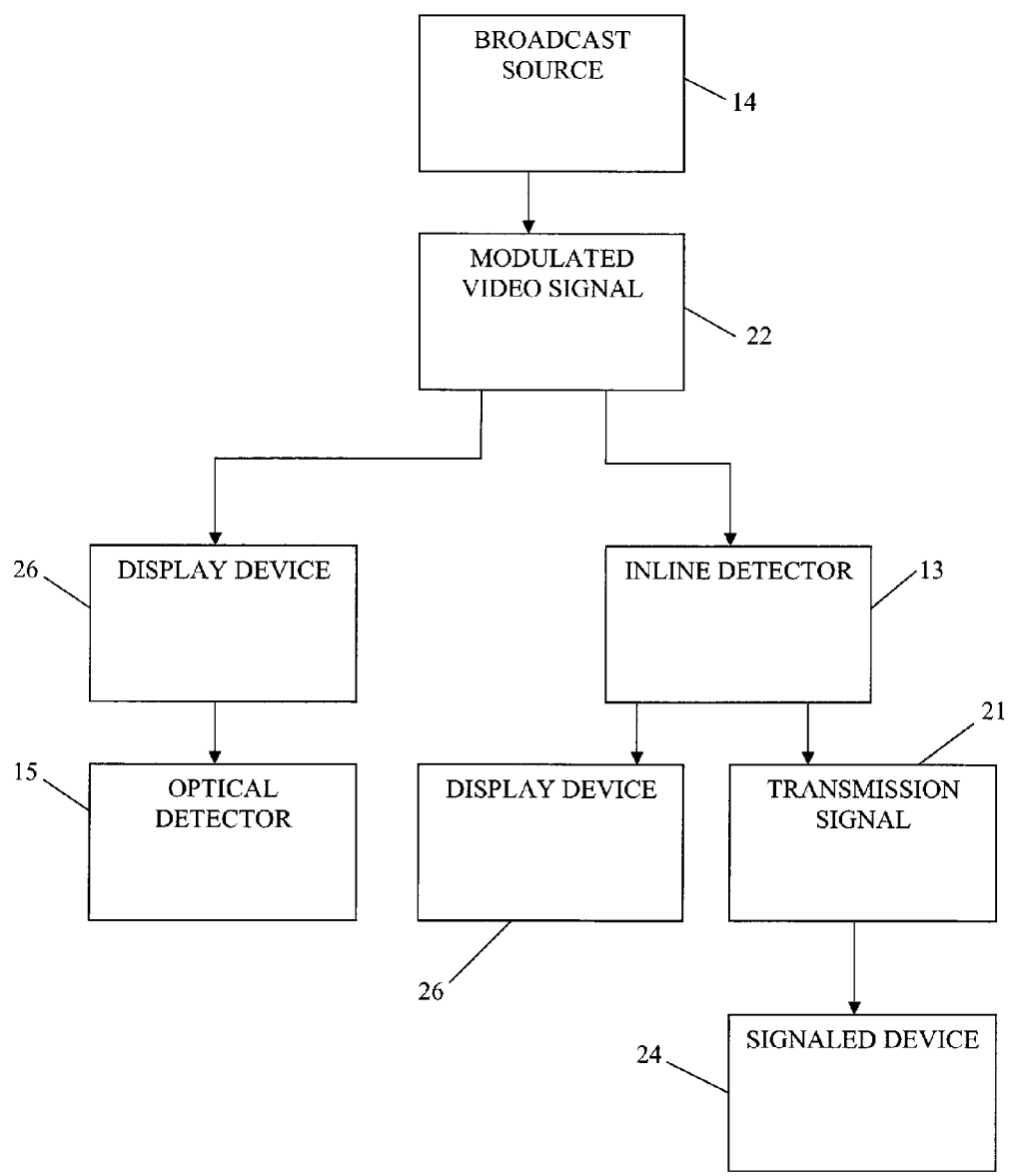
FIG. 2 is a block diagram of detecting components of the present invention.

Referring to FIG. 2, broadcast source 14 provides modulated video signal 22 to a device capable of detecting modulated auxiliary signal 20 such as an inline detector 13 or an optical detector 15. As discussed in greater detail below, the detector determines when auxiliary signal 20 is present in one or more fields of modulated video signal 22. When auxiliary signal 20 is suitably present, the detector provides indication of the presence of auxiliary signal 20 to a signaled device 24 by providing it with a signal presence. When auxiliary signal 20 is not suitably present the detector transmits a signal absence to signaled device 24, unless signaled device 24 is integral with the detector such that the detector can directly make use of the signal absence or signal presence.

Signaled device 24 is preferably a device which is capable of receiving and utilizing one or more signal absences (e.g., auxiliary signal 20 not suitably present) and signal presences (e.g., auxiliary signal 20 suitably present), such as a digital video recorder that uses the signal absences and signal presences to flag the checking of permissions to enable playback or recording of a video program.

Inline detector 13 provides the signal absences and signal presences to signaled device 24 by use of a transmission signal 21. Transmission signal 21 includes a wireless radio frequency, infrared and direct wire connection as well as other types of signals that may be sent and received. Preferably, signaled devices 24 utilize multiple signal absences and signal presences as bits of data that are used by signaled devices 24 to provide the viewer of the video program with a benefit such as a promotional opportunity or interactivity.

Display device 26 receives modulated video signal 22 either directly from broadcast source 14 or indirectly from inline detector 13. Display device 26 is preferably an analog television, but may also be other devices capable of presenting and/or recording video signals 18 such as a digital video recorder or digital television. It should further be appreciated that display device 26 and signaled device 24 may be combined into a signal unit.

As an alternative to inline detector 13, optical detector 15 does not receive transmission signal 21 but rather optically receives modulated video signal 22 directly from display device 26. Because of the capability of optical detection, optical detector 15 is preferably a hand-held device and is described in greater detail below.

Figure 3:
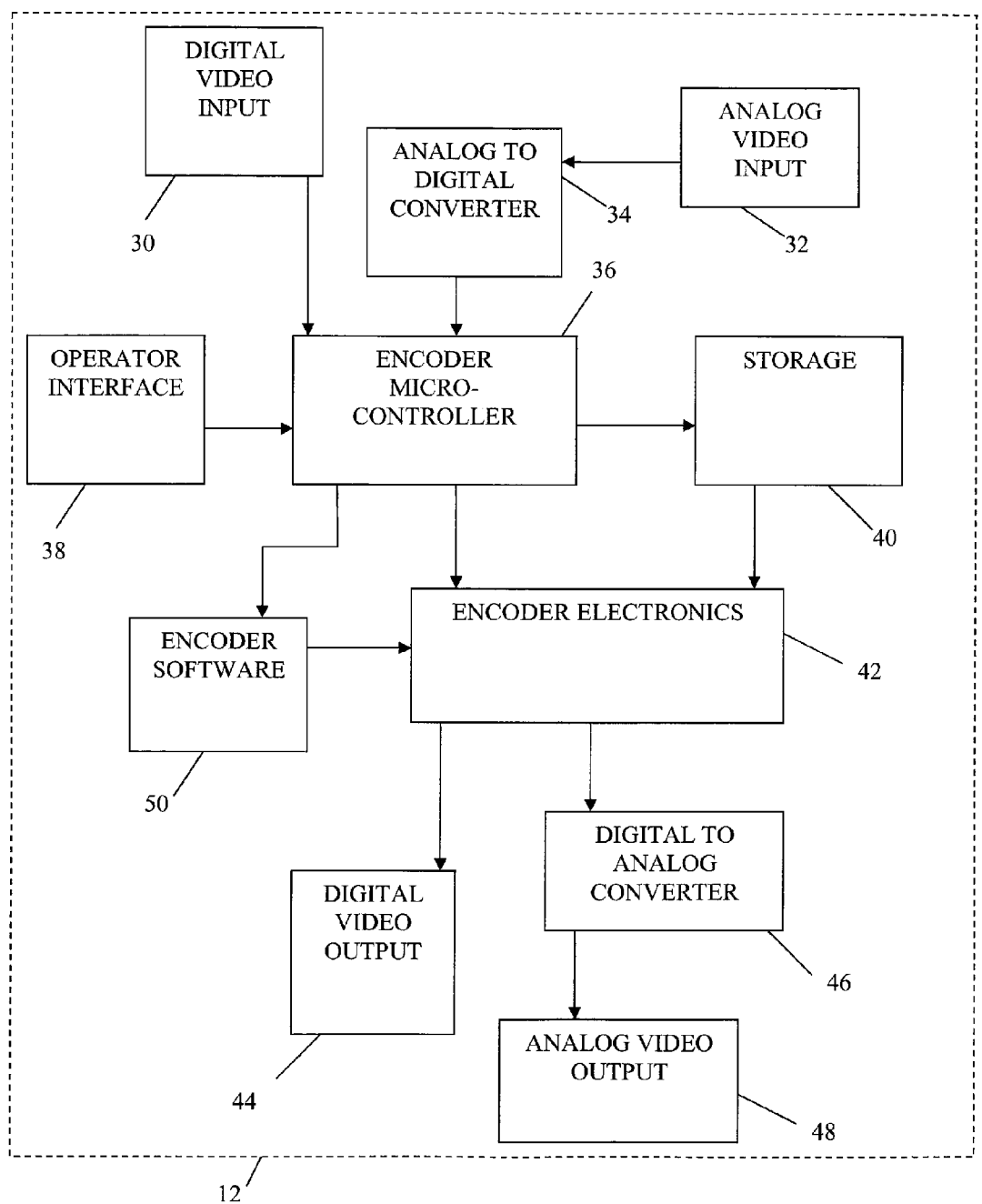
FIG. 3 is a block diagram of an encoder of the present invention.

Referring to FIG. 3, a representative embodiment of encoder 12 is shown to first comprise an encoder micro-controller 36 consisting of more than one processor and/or microprocessor to manage the various processing and input/output of the present invention, but preferably consists of a single processor. Encoder 12 further comprises a digital video input 30 that is capable of receiving video signal 18 from signal source 10 and passing it to encoder micro-controller 36. However, encoder 12 may receive an analog video signal 18 via analog video input 32 and analog to digital converter 34. Analog to digital converter 34 digitizes the analog video signal 18 according to known techniques such that it may be provided to encoder micro-controller 36 for use with the present invention.

An operator interface 38 is electrically connected to encoder micro-controller 36 and provides encoder micro-controller 36 with instructions of where, when and at what magnitude encoder 12 should selectively raise and lower the intensity of scan lines of video signal 18 or portions thereof at the direction of operator 16. Preferably, such instructions are received by operator interface 38 via a serial port. However it should appreciated in the art of computer hardware that other device interconnects of encoder 12 are contemplated including via universal serial bus (USB), "Firewire" protocol (IEEE 1394), and various wireless protocols. In an alternate embodiment, operator interface 38 may be implemented by and made integral with encoder software 50.

When encoder micro-controller 36 receives operator instructions and video signal 18, encoder software 50 manages further operation of encoder 12 and directs encoder micro-controller 36 to store the chrominance information (and/or luminance information as desired) of video signal 18 in storage 40. Storage 40 has the capacity to hold and retain signals (e.g., fields of video signal 18 and corresponding audio signals) in a digital form for access by a processor. Storage 40 may be primary storage and/or secondary storage, and preferably includes both memory and hard disk drive.

Encoder electronics 42 at the direction of encoder software 50 and encoder micro-controller 36 consist of various electrical components of the encoders of Broughton and/or its improvements not otherwise shown in FIG. 3 modulate the luminance of video signal 18 thereby creating modulated video signal 22 containing auxiliary signal 20. The resulting modulated video signal 22 is then sent digitally from encoder 12 by digital video output 44, or in analog form by converting the resulting digital signal with digital to analog converter 46 and outputting modulated video signal 22 by analog video output 48. However, it should be appreciated that encoder 12 (and inline detector 13 as described below) need not comprise both digital video input 30 and digital video output 44 in combination with analog video input 32 and analog video output 48, and that one selection of inputs and outputs may be selected.

It should be appreciated that the specific electronics and software used by encoder 12 may differ when its technology is included in a pre-existing device such as opposed to a stand alone custom device. Encoder 12 may comprise varying degrees of hardware and software, as various components may interchangeably be used.

Figure 4:
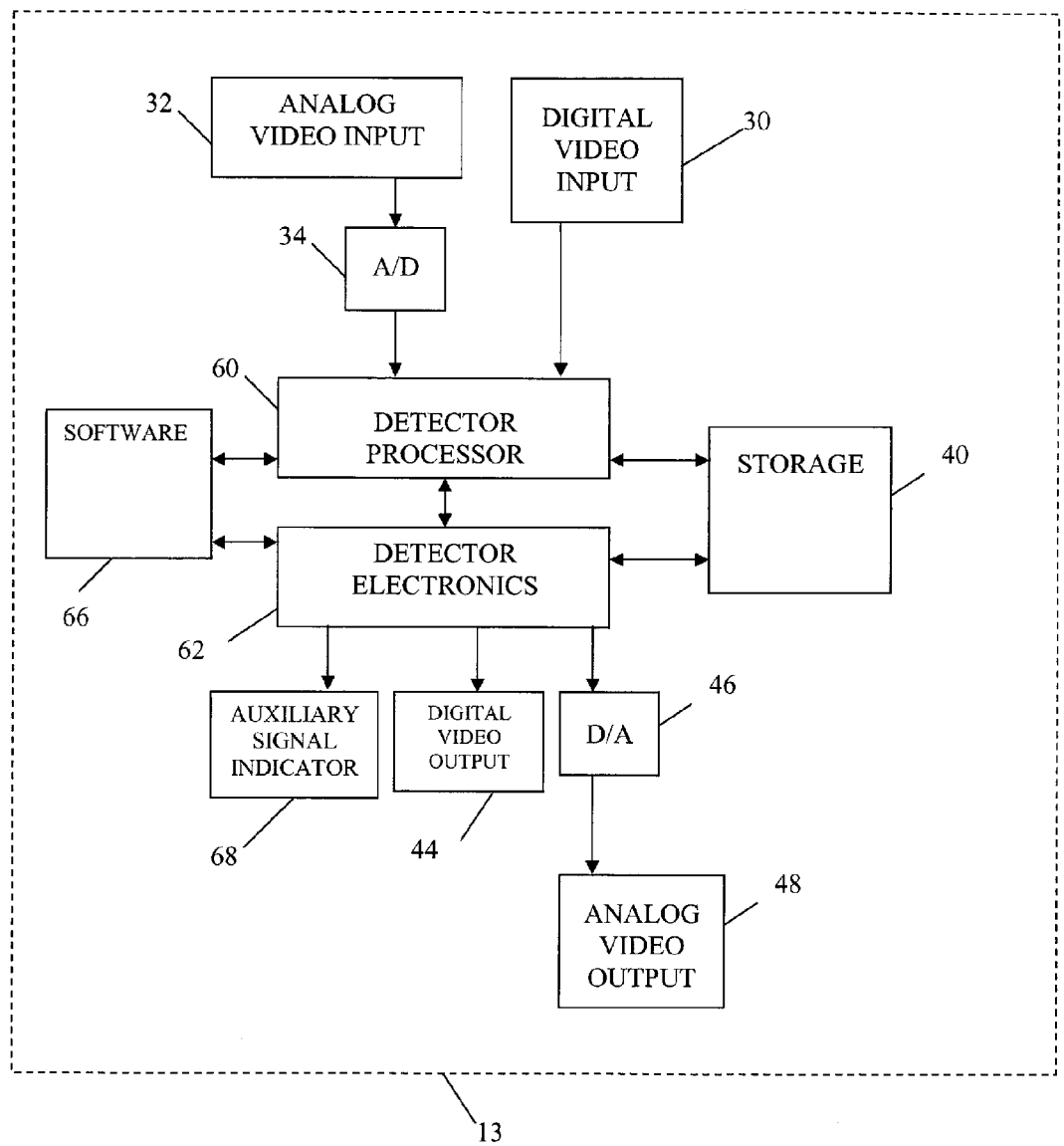
FIG. 4 is a block diagram of an inline detector of the present invention.

Referring to FIG. 4, a representative embodiment of a first type of detector is shown as inline detector 13. Inline detector 13 receives modulated video signal 22 from broadcast source 14 by analog video input 32 when modulated video signal 22 is analog, and by digital video input 30 when modulated video signal 22 is digital. Digital video input 30 directly passes modulated video signal 22 to detector processor 60, while analog video input 32 digitizes modulated video signal 22 by use of analog to digital converter 34 before passing modulated video signal 22 to detector processor 60. Analog video input 32 and digital video input 30 are therefore two examples of video signal input means of the present invention.

In the preferred embodiment, detector processor 60 stores the chrominance of modulated video signal 22 in storage 40 while detector electronics 62 detect scan lines or portions thereof that have increased or decreased intensity. Preferably, the detection scheme used in Broughton and its improvements are used with the present invention.

Signal presences and signal absences are transferred from inline detector 13 to signaled device 24 by auxiliary signal indicator 68. Inline detector 13 also outputs modulated video signal 22 in digital format via digital video output 44, and modulated video signal 22 in analog format by first converting modulated video signal 22 from the digital to analog format by use of digital to analog converter 46, and then outputting modulated video signal 22 via analog video output 48.

Figure 5:
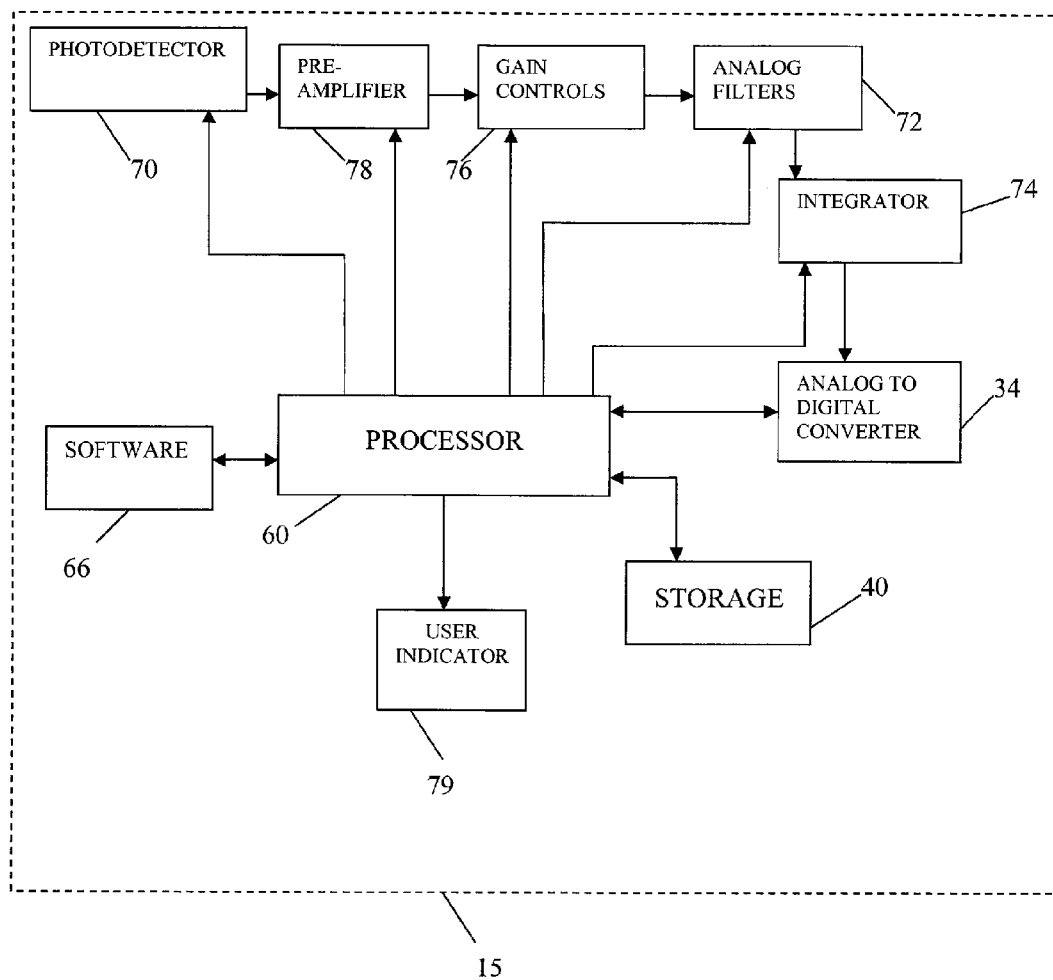
FIG. 5 is a block diagram of an optical detector of the present invention.

Referring to FIG. 5, another means for detecting auxiliary signal 20 is shown to comprise optical detector 15 that includes various components of signaled device 24 along with detector processor 60 and storage 40 which function as previously described above. Optical detector 15 further comprises photodetector 70, which is electrically coupled to detector processor 60 and capable of optically receiving modulated video signal 22 directly from display device 26.

Photodetector 70 in another examples of a video signal input means of the present invention.

Pre-amplifier 78 and gain controls 76 are electrically coupled to detector processor 60 and together amplify modulated video signal 22 by changing the feedback of control gain of feedback circuit. Detector processor 60 controls the amount of gain provided to the circuit. Pre-amplifier 78 and gain controls 76 are used with optical detector 15 as the distance and intensities received from display device 26 may vary. Accordingly, when the strength of modulated video signal 22 is low, optical detector 15 may add gain so that a better reading of modulated video signal 22 is possible.

Analog filters 72 are electrically coupled to detector processor 60 and provide a low pass filter that removes the high frequency noise from modulated video signal 22 by eliminating all frequencies above a preset level and cleans the signal below a frequency by discarding the undesired signal. Preferably, analog filters 72 are set for 15 Hertz center frequency so as to filter the video energy captured by means of the photodetector 70 (i.e., so that it will detect the a.c. nature of the 15 Hertz signal).

Integrator 74 is electrically coupled to detector processor 60 and detects and measures modulated video signal 22. Optional user indicator 79 is further electrically coupled to detector processor 60 and provides a visual and/or audio means to provide user of optical detector 15 with feedback, which may by way of example include notice of availability of promotional opportunities based on the receipt of auxiliary signals 20.

Figure 6:
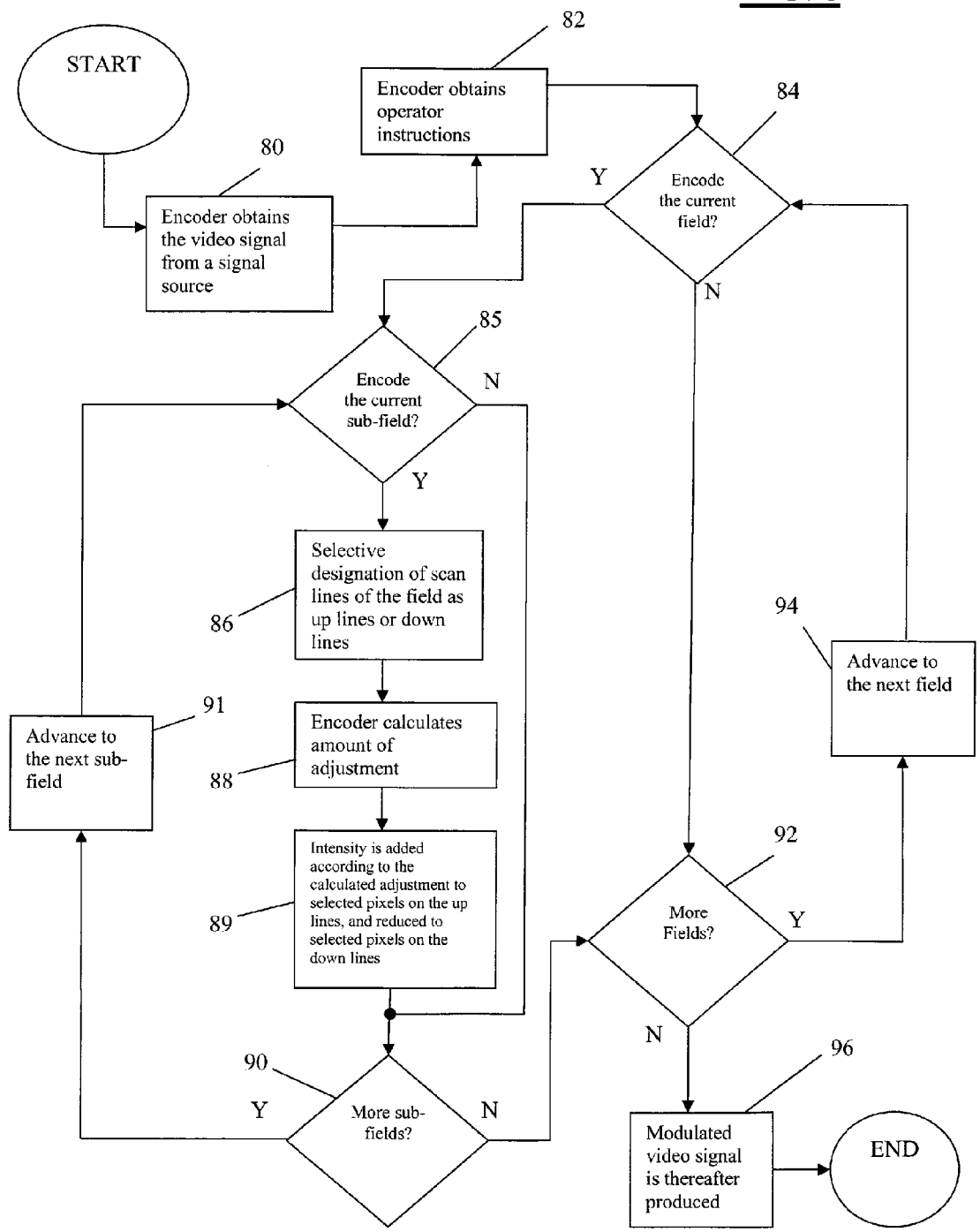
FIG. 6 is a flow chart of a general encoding method of the present invention.
Figure 10:
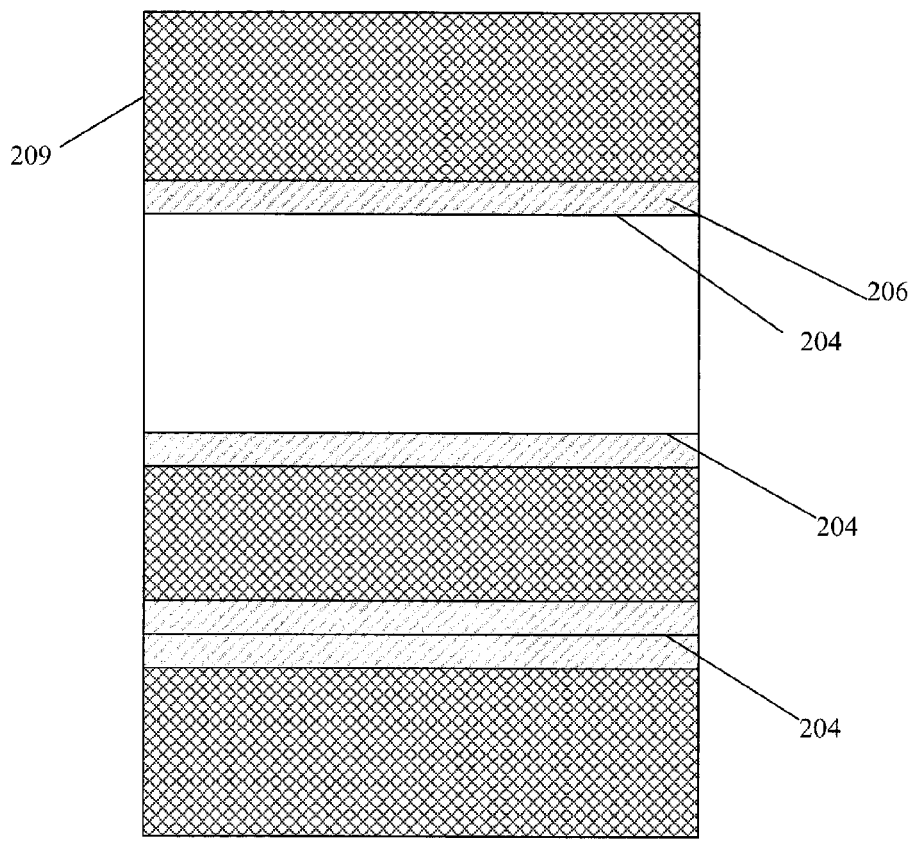
FIG. 10 is a field of a modulated video signal in a first embodiment of the present invention.
Figure 12:
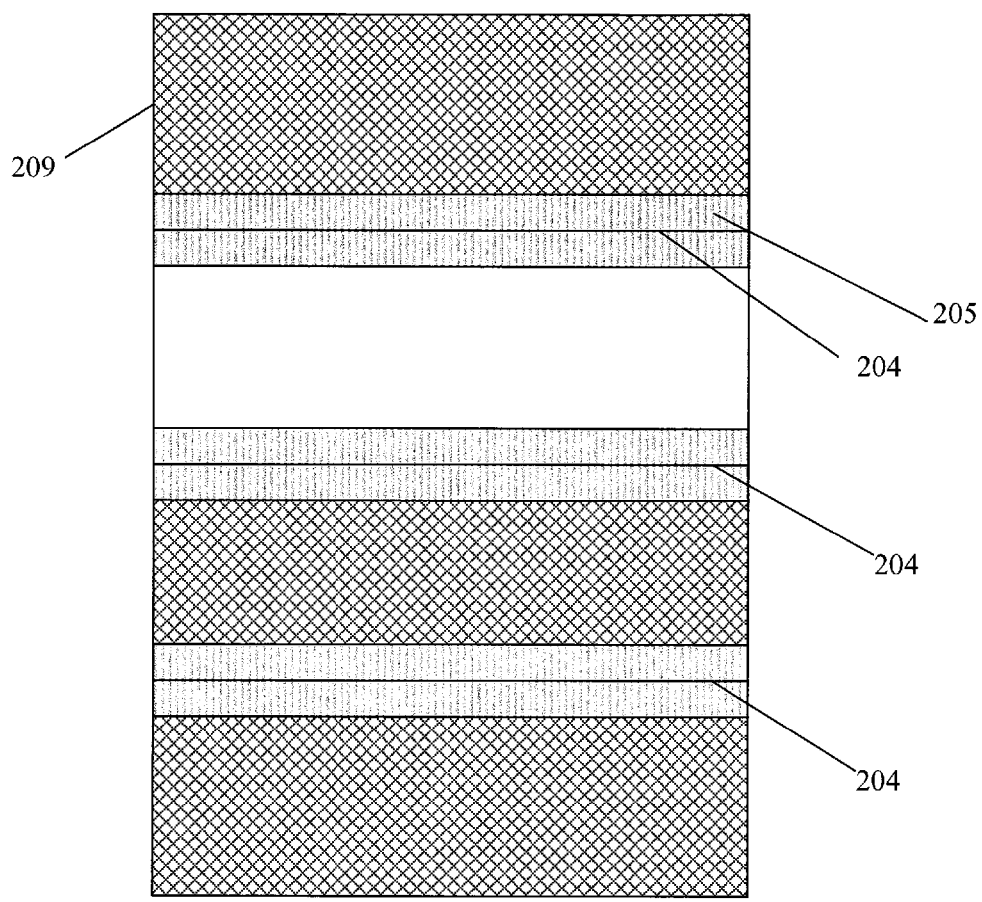
FIG. 12 is a field of a modulated video signal in a second embodiment of the present invention.

Referring to FIG. 6, the general encoding method of the present invention comprises a first step 80 where encoder 12 obtains video signal 18 from signal source 10. Thereafter, operator 16 at step 82 directs encoder 12 to modulate one or more sub-fields 209 (as shown in FIGS. 10 and 12 and described in greater detail below) of one or more fields of video signal 18, and such directions (i.e., operator instructions) are received by encoder 12 through operator interface 38. Preferably, a number of consecutive first fields in consecutive frames of video signal 18 are encoded, where the first field contains a single sub-field 209 (i.e., the single sub-field 209 is the field) that is modulated and the second field is preferably left unmodulated.

The desired number of sub-fields 209 is obtained from operator 16 by the operator instructions and the start of each sub-field 209 is calculated based on an offset from the vertical synch. When auxiliary signal 20 is modulated into a sub-field 209 and not an adjacent sub-field 209, a visible transition line 204 (as shown in FIGS. 10 and 12 and described in greater detail below) may appear in between the two sub-fields 209. In addition, the presence of auxiliary signal 20 in a sub-field 209 typically represents a data bit of "1", and the absence of auxiliary signal 20 in a sub-field 209 typically represents a data bit of "0".

It should be appreciated that use of the term "first field" as utilized with the present invention may refer to the first original field or the second field (e.g., the interlaced field) of the frame of video signal 18, with the term "second field" referring to the other field in the frame.

Encoder 12 at decision point 84 determines whether to modulate the current field of video signal 18 based on the previously received operator instructions. If no, encoder 12 skips the current field and thereafter proceeds to decision point 92. If yes, encoder 12 proceeds to decision point 85 to determine whether to encode the current sub-field 209 of video signal 18. It should be appreciated that when no sub-fields 209 of the current field are designated, that encoder 12 considers the total number of sub-fields 209 to be one (i.e., the sub-field 209 is the field) and therefore encodes the entire current field as described below.

If encoder 12 at decision point 85 is not to encode the current sub-field 209, encoder 12 skips the encoding process by proceeding to decision point 90. If encoder 12 is to encode the current sub-field 209, encoder 12 at step 86 designates the scan lines of the current sub-field of video signal 18 as either up lines or down lines, such that up lines may only have the intensity of its pixels increased and down lines may only have the intensity of its pixels decreased as described in greater detail below. Thereafter, encoder 12 at step 88 calculates the amount of adjustment to the intensity of the pixels of the scan lines as described in greater detail below.

Encoder 12 at step 89 adds intensity to selected pixels on the up lines and reduces intensity to selected pixels on the down lines, the amounts of which were calculated in the previous step. The process of altering the intensity is described in greater detail below. Upon completion, encoder 12 at decision point 90 determines whether there are remaining sub-fields of video signal 18 to analyze. If there are sub-fields remaining, encoder 12 advances to the next sub-field 209 in video signal 18 at step 91 and then returns to decision point 85. If there are no sub fields remaining, encoder 12 proceeds to decision point 92.

Encoder 12 at decision point 92 determines whether there are additional fields present in video signal 18. If yes, encoder 12 advances to the next field at step 94 and then returns to decision point 84. If no, encoder 12 at step 96 provides the resulting modulated video signal 22 to broadcast source 14 and the general encoding process is complete.

Figure 7:
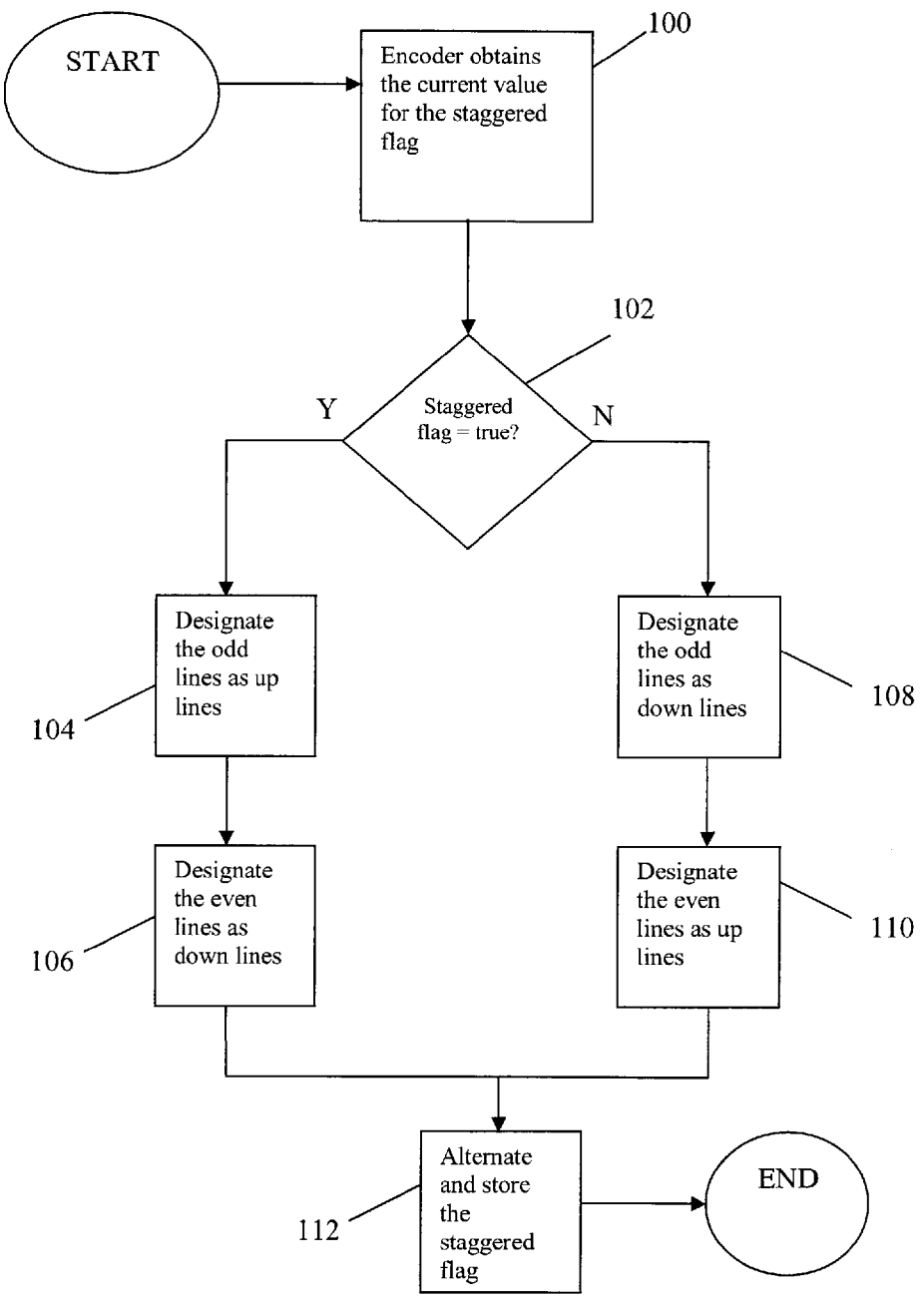
FIG. 7 is a flow chart of a staggered encoding method of the present invention.

Referring to FIG. 7, an improvement on the method of designating the scan lines during the encoding process comprises encoder 12 obtaining the value of a staggered flag at a step 100. The staggered flag is preferably a switch value that enables encoder 12 to alternate the designation of scan lines as an up line or a down line from one field to the next. It should also be appreciated that the staggered flag may be other known value tracking counters.

Encoder at decision point 102 determines whether the staggered flag is true (e.g., the switch is on). If yes, encoder 12 designates the odd lines in the field as up lines at step 104 and the even lines in the field as down lines at step 106. If the current field is even (i.e., not odd), encoder 12 at decision point 102 designates the odd lines of the field as down lines at step 108 and the even lines of the fields as up lines at step 110. Upon completion of step 106 or step 110, encoder 12 alternates and stores the new value for the staggered flag. Thereafter, the method of staggering designation of the scan lines is complete.

By the foregoing method of staggering the designation of scan lines of modulated video signal 22, the scan lines over a series of fields alternate between having intensity added to and removed from them. Thus, the overall intensity of the scan lines over a series of fields will not be increased or decreased, thereby eliminating a possible banding effect in the picture of the video program. The foregoing method thereby allows for higher levels of intensity to be added to and removed from video signal 18 during the encoding process to increase reliability of detection of auxiliary signal 20.

Preferably, the foregoing method of staggered designation of scan lines utilizes an entire field of video signal 18 that is not split into multiple sub-fields 209. However, it should be appreciated that the foregoing method of staggered designation may be adjusted to accompany multiple sub-fields 209 across multiple fields.

Figure 8:
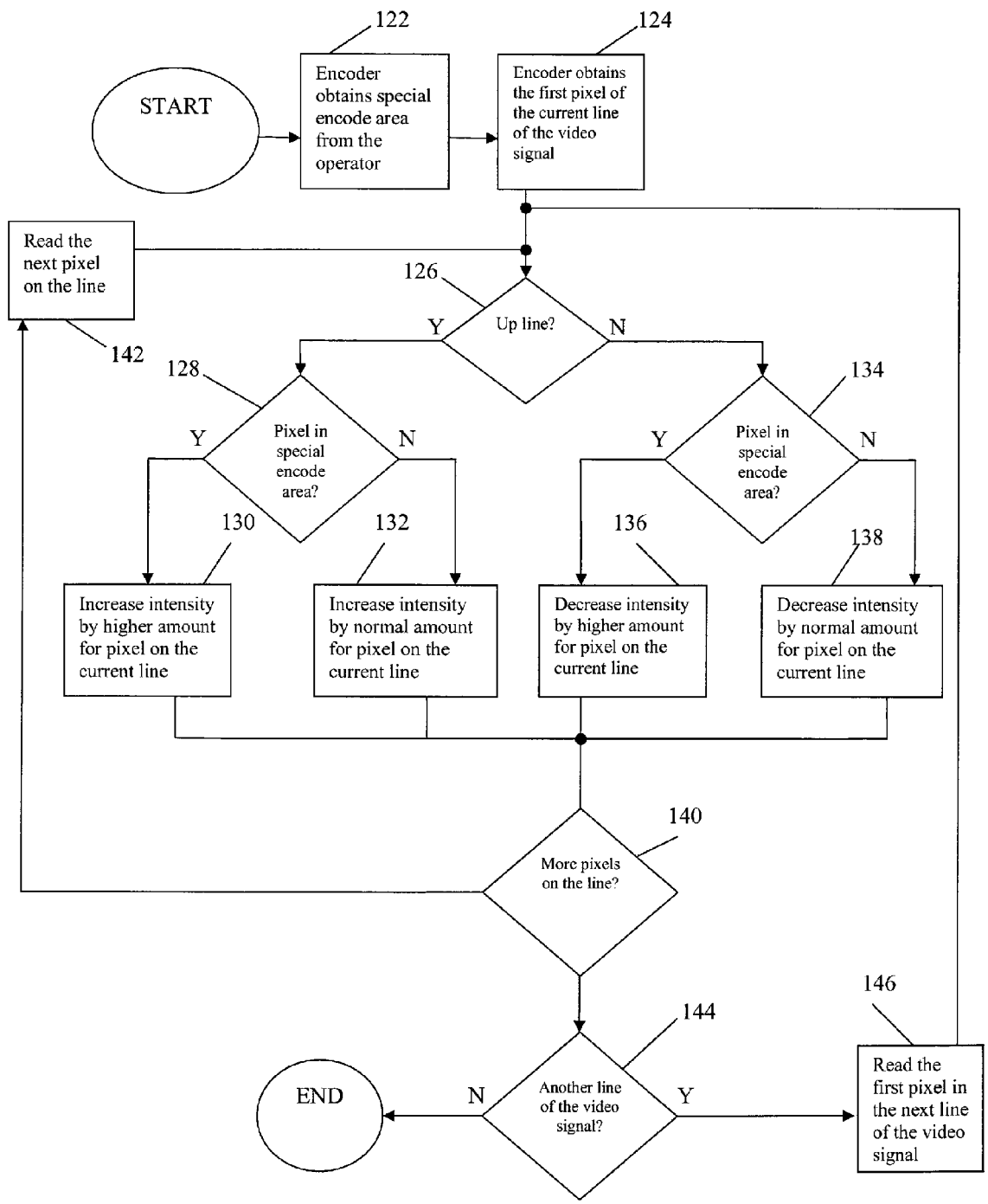
FIG. 8 is a flow chart of a zone based encoding method of the present invention.

Referring to FIG. 8, an improvement on the method of calculating the amount of intensity adjustment during the encoding process comprises a first step 122 where encoder 12 obtains special encode area instructions from operator 16. The special encode area instructions are preferably used during one or more scenes of a video program and designate a plurality of pixels in a predefined area of the field in which a greater magnitude increase and decrease in intensity is less likely to be perceptible by a viewer of the video program presented by modulated video signal 22 on display device 26. The special encode area is typically defined so as to encode more heavily on portions on the edge of the picture presented by modulated video signal 22 as viewers focus their attention on the center of display device 26 where the primary action of the video program occurs. Auxiliary signal 20 may alternatively be encoded heavier in the center of the picture where the most significant action occurs as the picture is less likely to be clear at such location. Operator 16 defines the dimensions of the special encode area primarily depending on the type of video program presented on display device 26 and the amount of screen movement associated with the program (e.g., action movie, drama show, et cetera). The increased in the magnitude of intensity added to and removed from the selected portions of the scan lines by encoder 12 causes auxiliary signal 20 to be more easily detected by a detector. It should be appreciated that when there are multiple sub-fields 209 in a field, the designation is over the entire field and not on a sub-field 209 basis.

Encoder at step 124 obtains the first pixel of the current line of video signal 18. Thereafter, encoder 12 at decision point 126 proceeds according to whether the current pixel of video signal 18 is on an up line or a down line as was previously determined at step 86. If the current pixel is located on an up line, encoder 12 proceeds to determine whether the current pixel is in the special encode area at decision point 128. If yes, encoder 12 at step 130 increases the intensity of the pixel by a higher amount. If no, encoder 12 at step 132 increases the intensity of the pixel by a normal amount. If the current pixel is on a down line, encoder 12 proceeds from decision point 126 to determine whether the current pixel is in the special encode area at decision point 134. If yes, encoder 12 proceeds to decrease the intensity of the pixel by the higher amount at step 136. If no, encoder 12 at step 138 proceeds to decrease the intensity of the pixel by the normal amount. It should be appreciated that the higher amount of intensity is relative to the normal amount, as the specific intensity values used by encoder 12 are dependent on the applications in which the present invention is used.

After alteration of the intensity of the current pixel, encoder 12 at decision point 140 determines whether there are additional pixels on the current scan line of video signal 18. If yes, encoder 12 advances to the next pixel in the current scan line of video signal 18 and returns to decision point 126. If no, encoder 12 proceeds to decision point 144 to determine whether there is another scan line in video signal 18. If yes, encoder 12 advances to the first pixel of the next scan line of video signal 18 at step 146 and returns to decision point 126. If no, encoder 12 completes the method of zone based encoding.

Figure 9:
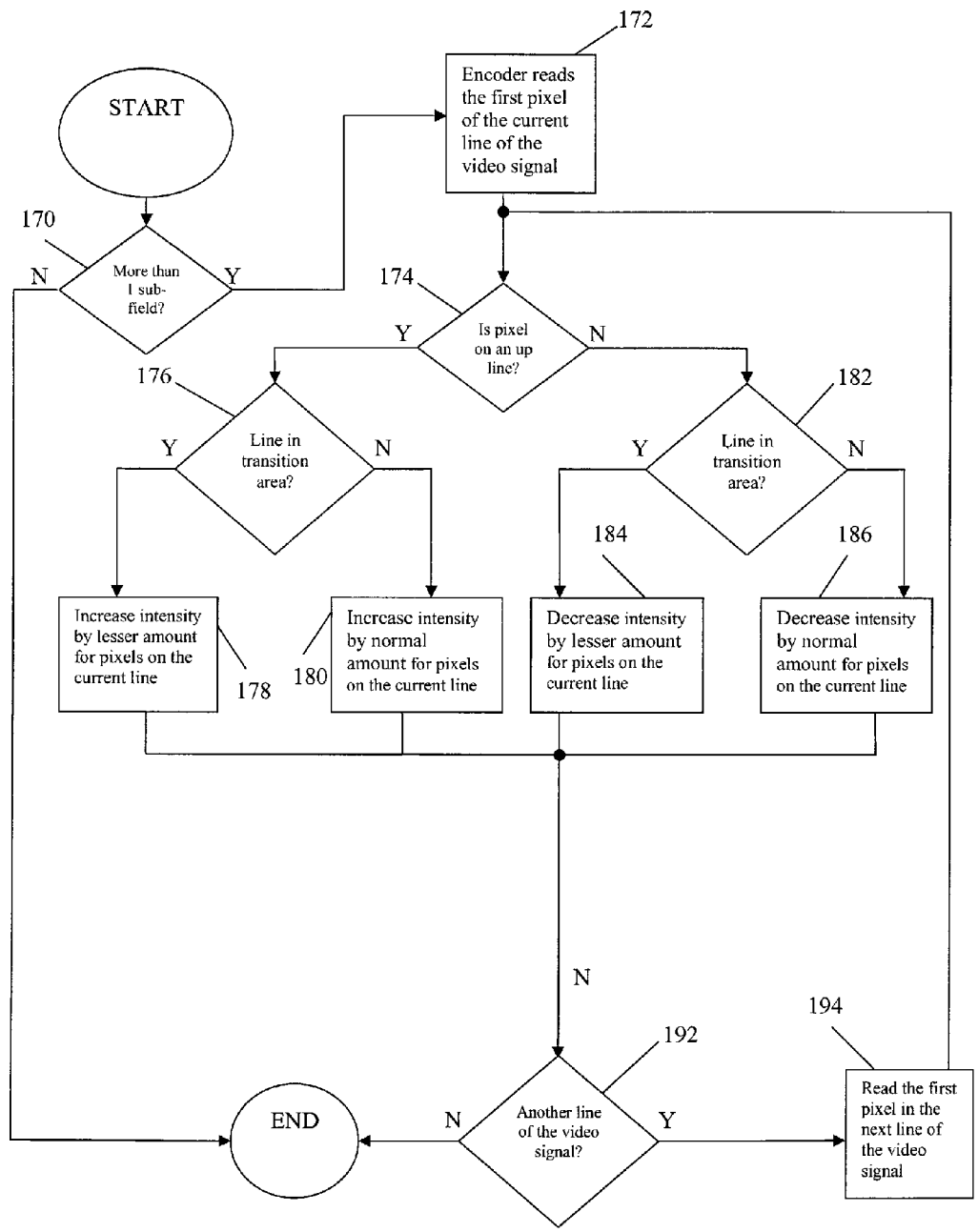
FIG. 9 is a flow chart of a method of fading transitions for the present invention.

Referring to FIGS. 9 and 10, the process for reducing the appearance of transition lines 204 within video signal 18 is first comprised of encoder 12 at decision point 170 determining whether there are multiple sub-fields 209 in the current field of video signal 18. If there is a single sub-field 209 in the current field, then there are no transition lines 204 and accordingly the process for fading at transition line 204 is complete. If there are multiple sub-fields 209 (i.e., at least one transition line 204), encoder 12 proceeds to step 172 to read the first pixel of the current line of video signal 18.

Encoder 12 determines at decision point 174 whether the current pixel is on an up line of video signal 18. If yes, encoder 12 proceeds to decision point 176 to determine whether the current line is in a transition area 206. If the current scan line is in transition area 206, encoder 12 increases the intensity of the pixels on the scan line by a lesser amount at step 178. If the current line is not in transition area 206, encoder 12 increases the intensity of the pixels on the current scan line by a normal amount. It should be appreciated that the lesser amount of intensity is relative to the normal amount, as the specific intensity values used by encoder 12 are dependent on the applications in which the present invention is used.

If the current line is determined to be a down line (i.e., not an up line) at decision point 174, encoder 12 then determines at decision point 182 whether the current scan line is in transition area 206. If yes, encoder 12 decreases the intensity of the pixels on the current scan line by a lesser amount at step 184. If no, encoder 12 at step 186 decreases the intensity of the pixels on the current scan line by a normal amount.

After adjustment of the intensity of the pixels of the current scan line at step 178, step 180, step 184 or step 186, encoder 12 at decision point 192 determines whether there are more scan lines in video signal 18. If yes, encoder 12 reads the first pixel in the next line of video signal 18 at step 194 and returns to decision point 174. If no, the process for fading at transition line 204 is complete. The appearance of transition line 204 in current field 208 is thereby improved by lessening the magnitude of the intensity added to or subtracted from pixels on scan lines located in transition areas 206.

Figure 11:
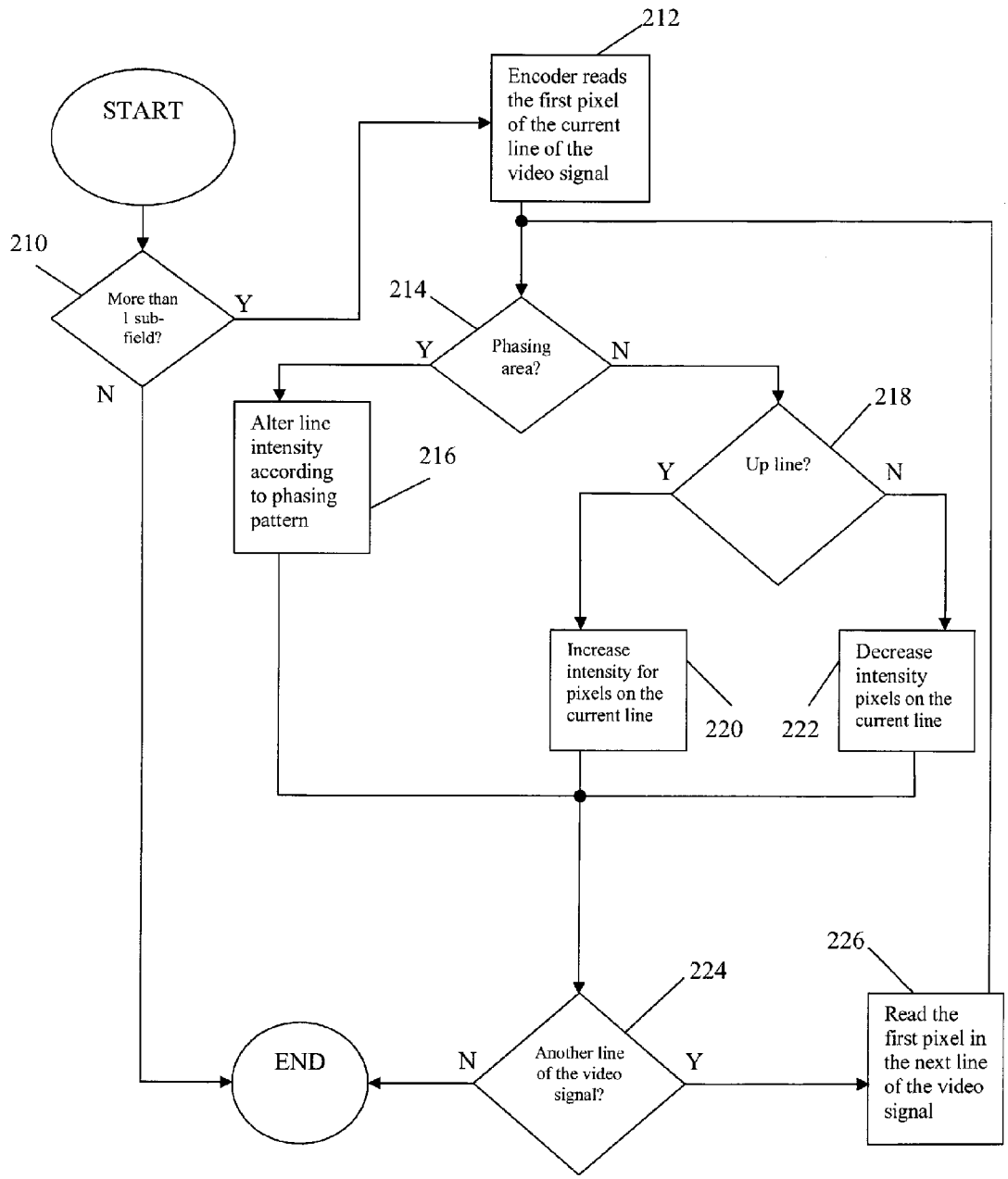
FIG. 11 is a flow chart of a method of phasing transitions for the present invention.

Referring to FIGS. 11 and 12, an alternate process for reducing the appearance of transition lines 204 within video signal 18 first comprises encoder 12 at decision point 210 determining whether there are multiple sub-fields 209 in the current field of video signal 18. If there is a single sub-field 209 in the current field of video signal 18, then there are no transition lines 204 and accordingly the phasing process is complete. If there are multiple sub-fields 209, encoder 12 proceeds to step 212 to read the intensity of the first pixel of the current scan line of video signal 18.

Encoder 12 at decision point 214 determines whether the current line of video signal 18 is located within in a phasing area 205 of the current field of video signal 18. If yes, the intensity of the current scan line of video signal 18 is altered at step 216 according to a phasing pattern such that the intensity alteration is less perceptible by being phased-in or phased-out over a series of scan lines. If no, encoder 12 at decision point 218 proceeds to determine whether the current scan line is an up line. If it is an up line, the intensities of the pixels on the current scan line are increased at step 220. If it is a down line, the intensities of the pixels on the current scan line are decreased at step 222.

Encoder 12 at decision point 224 determines where there are additional scan lines in video signal 18. If yes, encoder 12 at step 226 reads the first pixel in the next scan line of video signal 18 and returns to decision point 214. If no, the process of phasing at transition line 204 is complete.

The aforementioned phasing pattern involves morphing the intensity of the scan lines in a phasing area 205 such that carrier presence and carrier absence is visually imperceptible in phasing area 205. As shown in FIG. 12, phasing area 205 is an area of sub-field 209 proximate to transition line 204. The phasing pattern modulated by alteration of the rows of video signal 18 ease visibility transition from one sub-field 209 to another.

It should be appreciated that with the methods of phasing at transition line 204 and fading at transition line 204 that each sub-field 209 may be modulated utilizing a different modulation method.

It should also be appreciated that in an alternate embodiment of the foregoing, encoder 12 may track whether adjacent sub-fields 209 both have signal absences or signal presences such that encoder 12 will not phase or fade near transition line 204 of such sub-fields 209.

Figure 13:
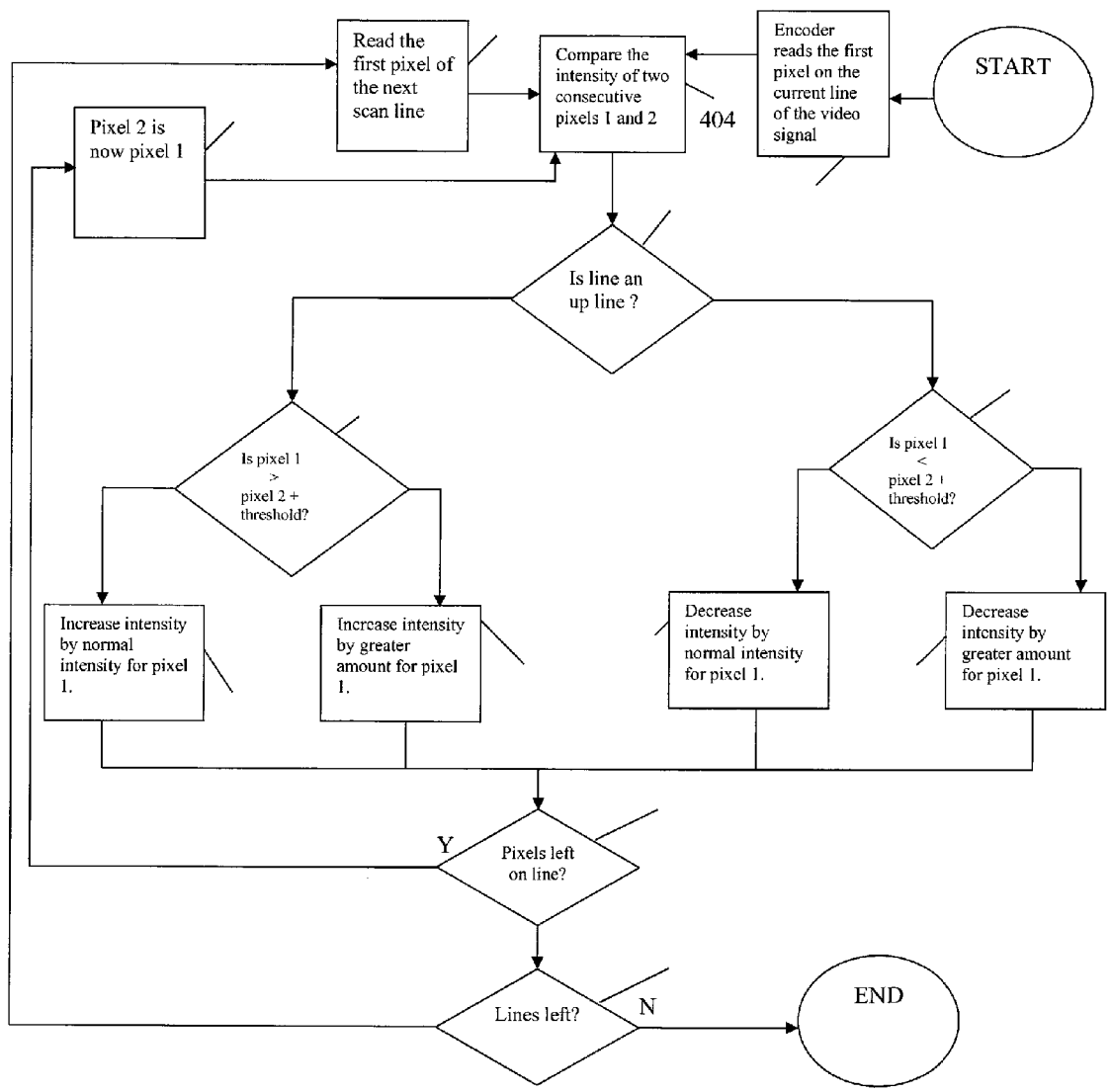
FIG. 13 is a flow chart of an edge encoding method of the present invention.

Referring to FIG. 13, an additional method for calculating the amount of adjustment at step 88 is shown to first comprise encoder 12 at step 400 reading the intensity of the first pixel on the current line of video signal 18. Thereafter, encoder 12 at step 404 compares the current pixel of video signal 18 with the next pixel of the current scan line of video signal 18, which are hereinafter referred to as pixel 1 and 2 respectively.

Encoder 12 at decision point 406 determines whether the current scan line of video signal 18 is an up line. If the current scan line is an up line, then encoder 12 at decision point 408 determines whether the value at pixel 1 is greater than the value of pixel 2 plus an edge threshold, where the edge threshold is a value indicative of a sufficient change in intensity to signify an edge in the picture of the video program. If yes, encoder 12 has determined that a sharp edge (i.e., contrast in adjacent pixels in the same field of video signal 18) is present in video signal 18 and at step 410 encoder 12 increases the intensity by a greater amount for pixel 1. If no, encoder 12 at step 412 increases the intensity by a normal amount for pixel 1.

If encoder 12 at decision point 406 determines that the current scan line is not an up line (i.e., a down line), then encoder 12 proceeds at decision point 420 to determine whether the intensity of pixel 1 is less than the intensity of pixel 2 plus the edge threshold. If yes, then encoder 12 has determined that a sharp edge is present in video signal 18 and encoder 12 at step 422 decreases the intensity by a normal amount for pixel 1. If no, encoder 12 at step 424 decreases the intensity by a greater amount for pixel 1.

Encoder 12 at decision point 430 determines whether there are more pixels left on the current scan line of video signal 18. If yes, encoder 12 proceeds to step 432 where it considers the current pixel 2 as pixel 1. Thereafter, encoder 12 returns to step 404 to further process the pixels of the scan line of video signal 18.

If at decision point 430 there are no pixels left on the current scan line of video signal 18, then encoder 12 proceeds to decision point 434 to determine whether there are addition scan lines in the field of video signal 18. If yes, then encoder 12 proceeds to step 436 read the first pixel of the next scan line. If no, then the process of edge encoding is complete.

It should be appreciated that multiple edge thresholds may be utilized with the present invention, such as exceeding a first edge threshold indicates a small edge where a first magnitude of intensity may be used while a second higher edge threshold indicates a large edge and a second greater magnitude of intensity may be used.

Figure 14:
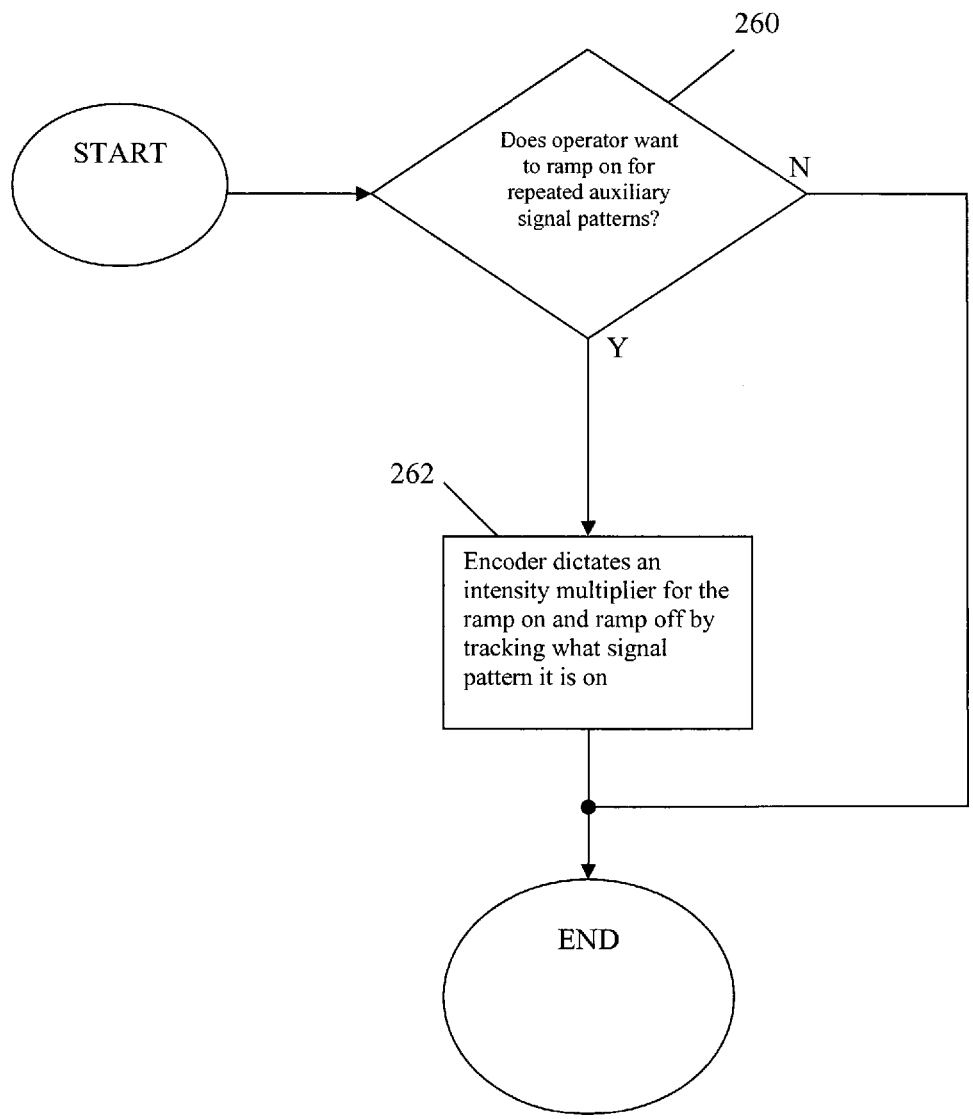
FIG. 14 is a flow chart of a ramp on/ramp off encoding method of the present invention.

Referring to FIG. 14, a further encoding method of the present invention is shown to first comprise a decision point 260 where operator 16 determines whether it is to ramp on and ramp off for repeated modulation patterns of auxiliary signal 20, where for each modulation pattern the same fields in a series of fields are modulated. If no, the process for ramping on and ramping off during encoding is complete. If yes, encoder 12 at step 262 dictates an intensity multiplier for the ramp on and ramp off by utilizing a value to track the number of times to repeat the modulation pattern for auxiliary signal 20 and gradually increasing and then decreasing the magnitude of intensity adjustment to the pixels of video signal 18 over the repetitions. Thus, auxiliary signal 20 is even less perceptible to the human eye by repetitions of auxiliary signal 20 at increasingly greater intensity adjustments to the pixels of the scan lines.

Figure 15:
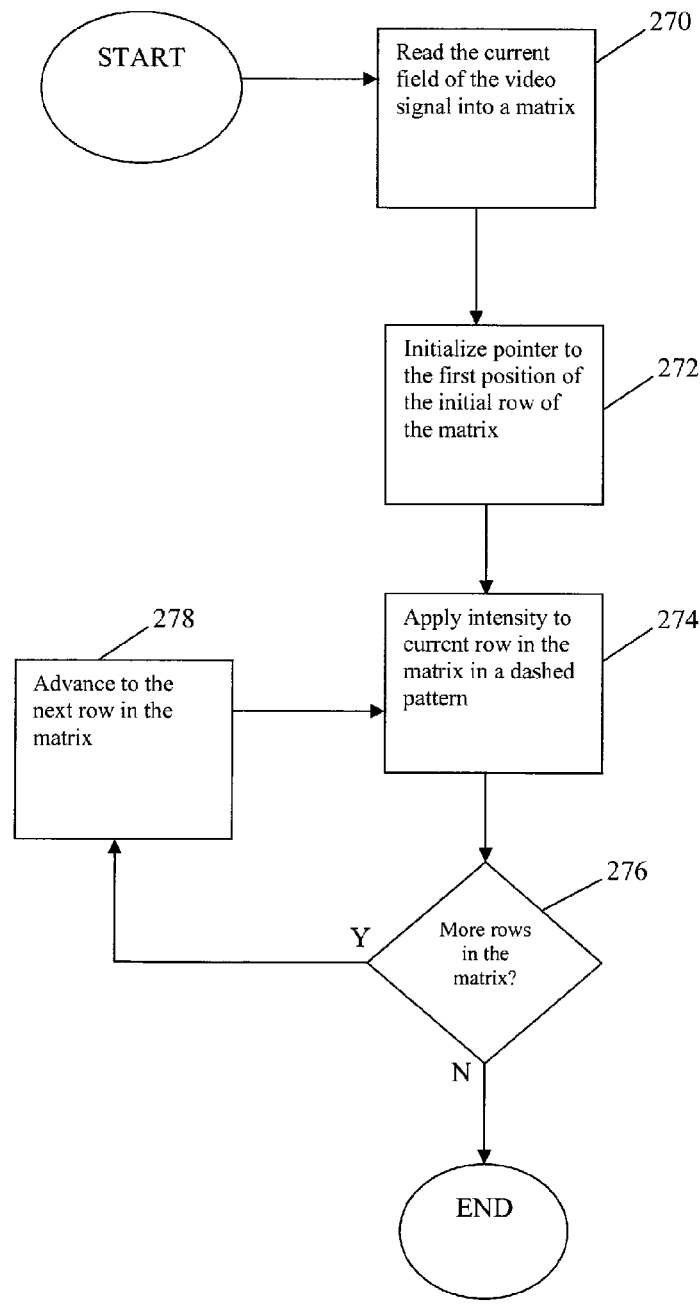
FIG. 15 is a flow chart of a dashed encoding method of the present invention.

Referring to FIG. 15, a further encoding method of the present invention is shown to first comprise a step 270 where encoder 12 reads the current field of video signal 18 into a matrix, where each position of the matrix corresponds to a pixel in the current field. Thereafter, encoder 12 at step 272 initializes a pointer to the first position of the initial row of the matrix.

Encoder 12 at step 274 applies intensity to the current row in the matrix in a dashed encoding pattern as described in greater detail below. Thereafter, encoder 12 at decision point 276 determines whether there are more rows in the matrix. If yes, encoder 12 at step 278 advances to the next row in the matrix and returns to step 274. If no, the process for dashed encoding is complete.

With the foregoing dashed encoding pattern, the intensity adjustment is utilized with some, but not all, of the pixels on a scan line. Thus, instead of raising and lowering the intensity on an entire scan line as in Broughton, the intensity is selectively added to a plurality of pixel groupings on scan lines so that the resulting auxiliary signal 20 is less perceptible but yet still detectable by optoelectronic or other electronic means.

Preferably, random intensity patterns are used, whereby the plurality of pixel groupings differ from one scan line to the next in the field and from the same scan in successive fields. Accordingly, with a randomly dashed encoding pattern no pattern is discernible thereby permitting a greater amount of intensity adjustment such that auxiliary signal 20 is more likely to be detected by optoelectronic or other electronic means.

Figure 16:
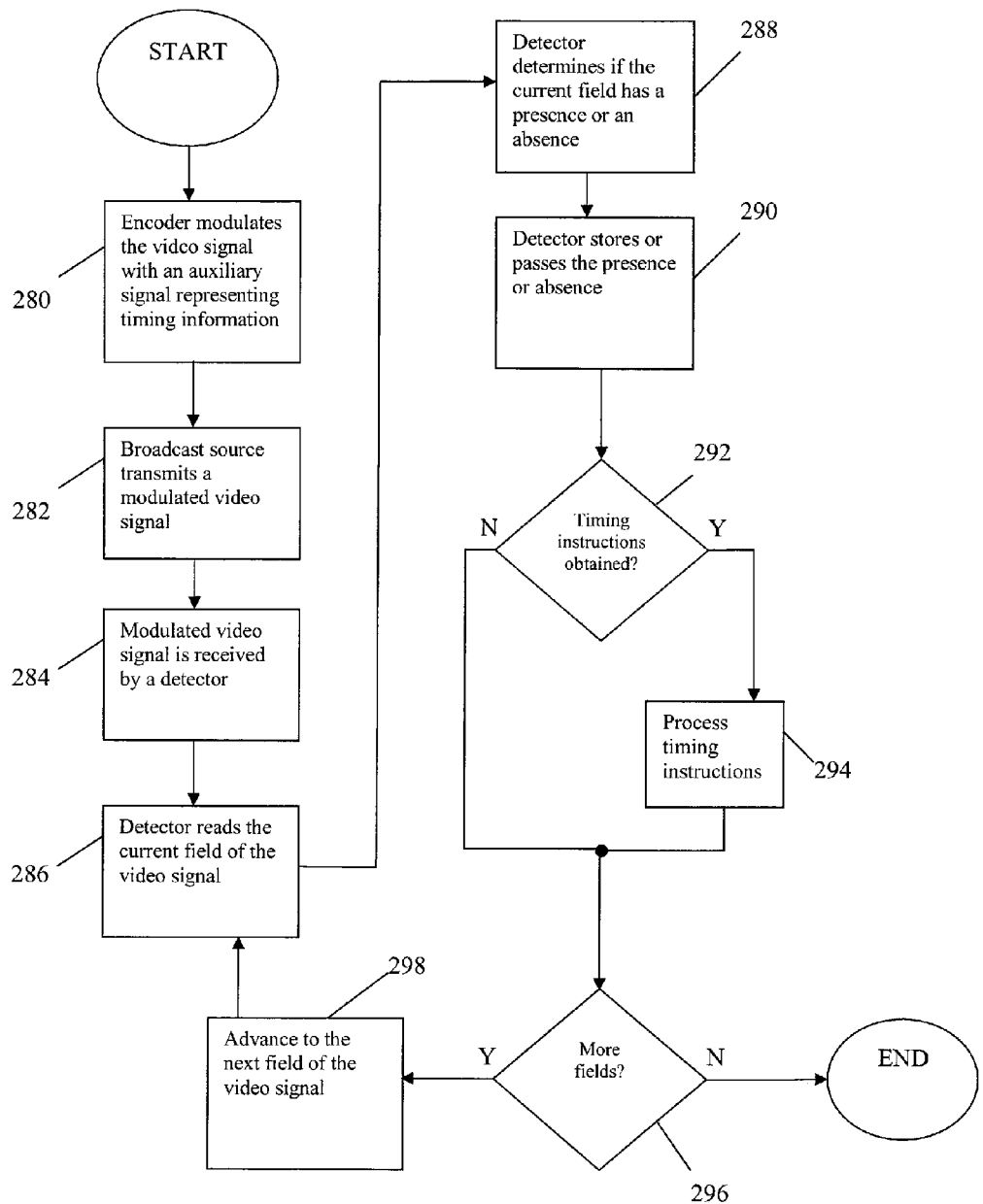
FIG. 16 is a flow chart of a timing information detection method of the present invention.

Referring to FIG. 16, a method for detecting timing information is shown to first comprise a step 280 where encoder 12 modulates video signal 18 with auxiliary signal 20, where auxiliary signal 20 contains both a benefit (e.g,. a promotional opportunity) and a time at which the benefit should be provided to a user (i.e., timing information). Thereafter, encoder 12 provides modulated video signal 22 to broadcast source 14. Broadcast source 14 at step 282 provides modulated video signal 22 to a detector either directly through inline detector 13 or indirectly through display device 26 and optical detector 15.

The detector reads the current field of video signal 18 at step 286. Thereafter, the detector determines whether the current field (or plurality of fields depending on the application) of video signal 18 is encoded with a signal absence or signal presence. The detector at step 290 either stores the signal absence or signal presence when the detector is optical detector 15, or passes the signal absence or signal presence to signaled device 24 when the detector is inline detector 13.

Optical detector 15 (or signaled device 24) at decision point 292 determines whether timing instructions have been obtained along with a benefit based on the receipt of a number of signal absences and signal presences. If yes, the device at step 294 processes the timing instructions and uses them to delay providing the benefit to the user of the device. Accordingly, the foregoing method enables benefits (e.g., promotional opportunities, television interactivity, action triggered on the device, etc.) to be provided earlier in time in the video signal 18.

The detector at decision point 296 determines whether there are more fields of video signal 18. If yes, the detector advances to the next field of video signal 18 and returns to step 286. Otherwise, the process for detecting timing information is complete.

It should be appreciated from the foregoing modulation methods of video signal 18 that encoder 12 may modulate line by line, field by field, frame by frame, and by other methods known in the art.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

We claim:

1. A method comprising:
   identifying a plurality of sub-areas of an encoding area of a frame and a transition area between the plurality of sub-areas of the encoding area;
   designating a first magnitude alteration pattern for the plurality of sub-areas;
   designating a second magnitude alteration pattern for the transition area, wherein the first magnitude alteration pattern is not the same pattern as the second magnitude alteration pattern and the second magnitude alteration pattern is selected to reduce transition line visibility between the plurality of subareas;
   altering intensity of a plurality of pixels of the plurality of sub-areas as designated by the first magnitude alteration pattern; and
   altering the intensity of the plurality of pixels of the transition area as designated by the second magnitude alteration pattern.

2. The method of claim 1, wherein the first magnitude alteration pattern includes altering the intensity of the pixels by a first magnitude adjustment and the second magnitude alteration pattern includes altering the intensity of the pixels by a second magnitude adjustment, wherein the first magnitude adjustment is less than the second magnitude adjustment.

3. The method of claim 1, wherein the second magnitude alteration pattern includes a phased-in intensity alteration pattern.

4. The method of claim 1, wherein the second magnitude alteration pattern includes a phased-out intensity alteration pattern.

5. The method of claim 1, wherein the second magnitude alteration pattern includes a morphed pattern.

6. The method of claim 1, wherein the encoding area includes a field.

7. The method of claim 1, farther comprising:
   selecting a series of intensity multipliers, wherein the altering of the intensity of the plurality of pixels is in accordance with an intensity multiplier.

8. The method of claim 1, wherein the encoding area is a field of the frame.

9. An encoding system comprising:
   a source; and
   an encoder configured to:
   obtain a video signal from a source, the video signal comprising a plurality of frames,
   identify a plurality of sub-areas of an encoding area of a particular frame of the video signal and a transition area between the plurality of sub-areas of the encoding area,
   designate a first magnitude alteration pattern for the plurality of sub-areas,
   designate a second magnitude alteration pattern for a transition area, wherein the first magnitude alteration pattern is not the same pattern as the second magnitude alteration pattern and the second magnitude alteration pattern is selected to reduce transition line visibility between the plurality of subareas,
   alter the intensity of a plurality of pixels of the plurality of sub-areas as designated by the first magnitude alteration pattern; and
   alter the intensity of the plurality of pixels of the transition area as designated by the second magnitude alteration pattern.

10. A method for modulating a video signal comprising:
    selecting frames of a plurality of frames for modulation;
    determining locations of edges in a plurality of scan lines of a field for each selected frame;
    designating a first magnitude adjustment for the locations of edges;
    designating a second magnitude adjustment for a remainder portion of the field for each selected frame, wherein the first magnitude adjustment is not the same value as the second magnitude adjustment; and
    altering the intensity of the plurality of pixels of the plurality of scan lines of the field of the selected frames as designated by either the first magnitude adjustment or the second magnitude adjustment.

11. The method of claim 10, wherein the first magnitude adjustment is greater than the second magnitude adjustment.

12. The method of claim 10, wherein the designating a first magnitude adjustment includes designating a higher magnitude adjustment for locations of edges having a sharp edge and designating a lower magnitude adjustment for locations of edges not having a sharp edge.

13. The method of claim 10, wherein the field includes an interlaced field.

14. The method of claim 10, further comprising selecting a series of intensity multiplies.

15. The method of claim 14, wherein altering intensity of a plurality of pixels includes for each intensity multiplier, altering the intensity of the plurality of pixels of the plurality of scan lines of the field of the selected frames as designated by either the first magnitude adjustment adjusted by the intensity multiplier or the second magnitude adjustment adjusted by the intensity multiplier.

16. An encoding system comprising:
    a source; and
    an encoder configured to:
    obtain a video signal from a source, the video signal comprising a plurality of frames, each of the plurality of frames each comprising a plurality of scan lines, each of the plurality of scan lines comprising a plurality of pixels, each of the plurality of pixels comprising an intensity,
    select frames of the plurality of frames for modulation;
    determine locations of edges in the plurality of scan lines of a field for each selected frame,
    designate a first magnitude adjustment for the locations of edges;
    designate a second magnitude adjustment for a remainder portion of the field for each selected frame, wherein the first magnitude adjustment is not the same value as the second magnitude adjustment, and
    alter the intensity of the plurality of pixels of the plurality of scan lines of the field of the selected frames as designated by either the first magnitude adjustment or the second magnitude adjustment.

17. A method for modulating a video signal comprising:
- accessing a series of frame intensity multipliers, the series including a plurality of different intensity multipliers;
- accessing frames of a plurality of frames for modulation;
- associating each frame intensity multiplier of the series of intensity multipliers with one or more frames from the accessed frames; and
- for each intensity multiplier, altering the intensity of the plurality of pixels of an encoding area of the accessed frames according to a magnitude alteration pattern that is adjusted by the associated frame intensity multiplier.

18. The method of claim 17, wherein the series of frame intensity multipliers includes a first series of increasing frame intensity multipliers and a second series of decreasing frame intensity multipliers.

19. The method of claim 18, further comprising applying the first series of increasing frame intensity multipliers to even scan lines of a plurality of scan lines of the encoding area.

20. The method of claim 19, further comprising applying the second series of decreasing intensity multipliers to odd scan lines of a plurality of scan lines of the encoding area.

21. An encoding system comprising:
- a source; and
- an encoder configured to:
- obtain a video signal from a source, the video signal comprising a plurality of frames,
- access a series of frame intensity multipliers, the series including a plurality of different intensity multiplier,
- access frames of the plurality of frames for modulation,
- associate each frame intensity multiplier of the series of intensity multipliers with one or more frames from the accessed frames, and
- for each intensity multiplier, altering the intensity of the plurality of pixels of the accessed frames according to a magnitude alteration pattern that is adjusted by the associated frame intensity multiplier.

* * * * *